United States Patent [19]

Crawford et al.

[11] Patent Number: 6,130,732
[45] Date of Patent: Oct. 10, 2000

[54] PAPER-WHITE REFLECTIVE DISPLAY AND METHODS OF FORMING THE SAME

[75] Inventors: Greg P. Crawford, Providence, R.I.; Thomas G. Fiske, Campbell, Calif.; Louis D. Silverstein, Scottsdale, Ariz.

[73] Assignee: Xerox Corporation, Stamford, Conn.

[21] Appl. No.: 08/792,307

[22] Filed: Jan. 31, 1997

[51] Int. Cl.[7] ........................... G02F 1/137; G02F 1/1347
[52] U.S. Cl. ................... 349/86; 349/92; 349/78; 349/110; 349/94; 349/130; 349/132; 349/176
[58] Field of Search .................... 349/74, 86, 92, 349/94, 105, 183, 186, 78, 110, 130, 132

[56] References Cited

U.S. PATENT DOCUMENTS

| | | |
|---|---|---|
| 4,596,445 | 6/1986 | Fergason . |
| 5,200,845 | 4/1993 | Crooker et al. . |
| 5,748,272 | 5/1998 | Tanaka et al. . |
| 5,751,452 | 5/1998 | Tanaka et al. . |

OTHER PUBLICATIONS

K. Tanaka et al., *Holographically formed liquid–crystal/polymer device for reflective color display*, Journal of the Society for Information Display, vol. 2, No. 1, Apr. 1, 1994, pp. 37–40.

K. Tanaka et al., *18.1: Optimization of Holographic PDLC for Reflective Color Display Applications*, SID 95 Digest, pp. 267–270.

K. Tanaka et al., "Optimization of Holographic PDLC for Reflective Color Display Applications," SID 95 Digest, pp. 267–270.

Gregory P. Crawford et al., "Reflective Color Displays for Imaging Applications," Proceedings of the IS&T/SID 1995 Color Imaging Conference: Color Science, Systems and Applications, pp. 52–58.

K. Tanaka et al., "A Liquid–Crystal/Polymer Optical Device Formed by Holography for Reflective Color Display Applications," PDLC–2, pp. 109–111.

M. Date et al., "Three–Primary–Color Holographic Polymer Dispersed Liquid Crystal (HPDLC) Devices for Reflective Displays," ASIA Display '95, pp. 603–606.

M. Kreuzer et al., "New Liquid Crystal Display with Bistability and Selective Erasure Using Scattering in Filled Nematics," *Appl. Phys. Lett.* 62(15), Apr. 12, 1993, pp. 1712–1714.

Gregory P. Crawford and Slobodan Zumer, eds., *Liquid Crystals in Complex Geometries*, 1996: Chapter 5, D.–K. Yang et al., "Polymer–Stabilized Cholesteric Textures," pp. 103–142; Chapter 11, J. L. West, "The Challenge of New Applications to Liquid Crystal Displays," pp. 255–264; Chapter 12, H. Yuan, "Bistable Reflective Cholesteric Displays," pp. 265–280; and Chapter 15, M. Kreuzer et al., "Filled Nematics," pp. 307–324.

"Wide–Angle View PDLC Displays", J. W. Doans et al., Liquid Crystal Institute and Department of Physics, Kent State University—Pacific Polymer Preprint– pp. 245–247– 1989.

*Primary Examiner*—William L. Sikes
*Assistant Examiner*—Tai V. Duong
*Attorney, Agent, or Firm*—Oliff & Berridge, PLC

[57] ABSTRACT

A paper-white reflective display that has improved photopic white reflectance, a high contrast, a lack of haze or opaqueness when viewed from various viewing angles and lower drive voltages. The paper-white reflective display includes first and second substrates, a plurality of groups of liquid crystal and polymer layers located between the first and second substrates, each of the plurality of groups of liquid crystal and polymer layers being reflective of different wavelengths of light and a voltage source connected between the first and second substrates that selectively applies a voltage to all of the liquid crystal and polymer layers.

26 Claims, 9 Drawing Sheets

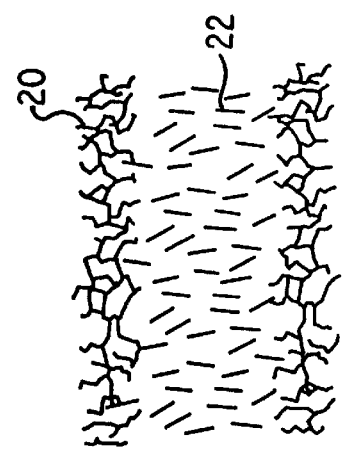
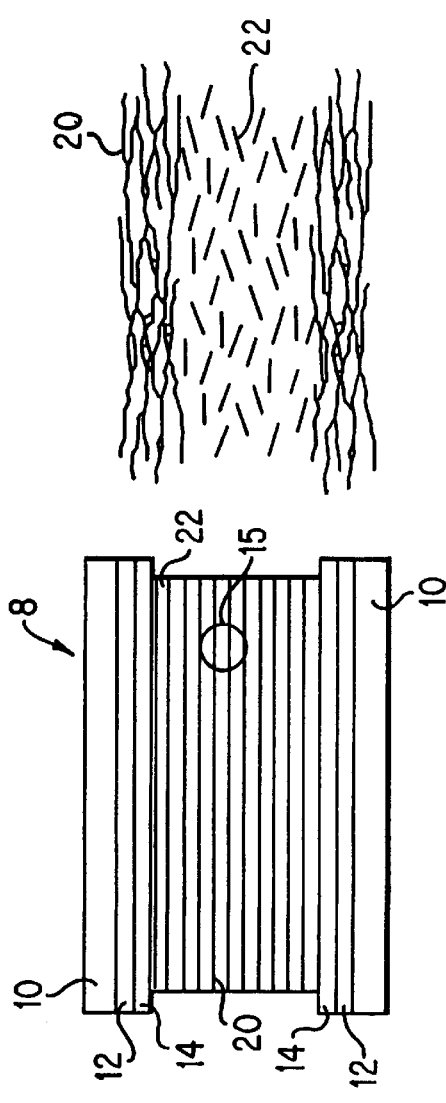
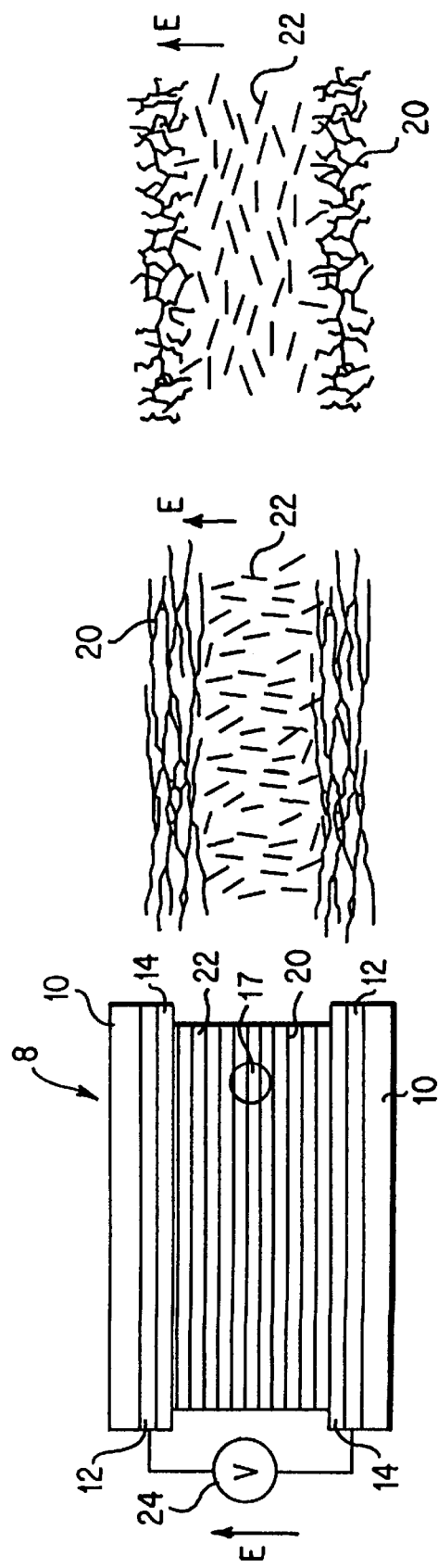

PAPER-WHITE REFLECTIVE DISPLAY AND METHODS OF FORMING THE SAME

BACKGROUND OF THE INVENTION

1. Field of the Invention

This invention relates to a reflective display and methods of forming the same. In particular, the invention relates to a paper-white liquid crystal reflective display and methods of forming the same.

2. Description of Related Art

Several types of reflective liquid crystal displays have recently been developed. Many of these reflective liquid crystal displays utilize liquid crystal-polymer dispersion technologies. Such displays are superior to conventional polarizer based displays for reflective mode operation.

An example of one type of such a reflective liquid crystal display is the polymer-dispersed liquid crystal (PDLC) display, which operates on the principle of electrically controlled light scattering. With this technology, liquid crystal droplets are embedded in a polymer matrix. In the off-state, the alignment of the liquid crystal droplets (symmetry axis) is random, resulting in an opaque, scattering film because of the mismatch between effective refractive index of the liquid crystal with that of the polymer. Upon application of an electric field, the liquid crystal within the liquid crystal droplets aligns parallel to the electric field and the composite material becomes transparent. However, contrast ratios in the direct-view reflective mode are in the 5–10:1 range and are strongly cell thickness dependent. Further, the reflectivity of the polymer dispersed liquid crystal reflective display is only about 12 to 15%.

Another type of reflective liquid crystal display is the polymer dispersed cholesteric liquid crystal display (PDCLC), which operates on the principle of Bragg reflection. Such cholesteric liquid crystal displays have a contrast ratio approaching approximately 10:1 with a photopic reflectivity of 10–13% under ambient lighting conditions and approximately 40% peak reflectivity at the Bragg wavelength.

Another type of reflective liquid crystal display is a polymer stabilized cholesteric texture (PSCT) reflective display. The polymer stabilized cholesteric texture reflective display uses a small amount of polymer additive in the cholesteric liquid crystal medium which assembles into an ordered stabilizing network. Contrast ratios have been reported between 20–30:1 with 10 to 15% photopic reflection under ambient lighting conditions, and nearly 40% peak reflectivity at the Bragg wavelength. Similar displays have been demonstrated without the polymer with comparable performance.

A more recent type of reflective liquid crystal display is the holographic polymer dispersed liquid crystal display. Such a display is reported in "Holographically formed liquid crystal/polymer device for reflective color displays", by Tanaka et al., as reported in the Journal of the Society for Information Display, Volume 2, No. 1, 1994, pages 37–40. Further developments by Tanaka et al. reported on optimization of such a holographic liquid crystal display in "Optimization of Holographic PDLC for Reflective Color Display Applications" in the SID '95 Digest, pages 267–270. This holographically formed polymer dispersed liquid crystal is formed using optical interference techniques (reflection holography) to form planes of liquid crystal droplets at predesignated positions within the sample setting up a modulation in the liquid crystal droplet densities. The resulting optical interference reflects the Bragg wavelength in the off-state when the liquid crystal material directors encapsulated within the droplets are misaligned. Upon application of an applied voltage, the periodic refractive index modulation vanishes if the refractive index of the liquid crystal is approximately matched with the refractive index of the polymer, and all incident light is transmitted. The spectral reflectance of the display is determined during the fabrication process and can be chosen to reflect any visible wavelength. The above-described holographic liquid crystal/polymer reflective color display is formed with an isotropic polymer which results in liquid crystal droplets being formed during the phase separation. Because the polymer is isotropic, the molecules of the polymer are randomly aligned and the display device has visible opaqueness or haze when viewed from an angle due to the mismatch between the effective refractive index of the liquid crystal and that of the polymer becomes enhanced at wide angles. Additionally, this display device requires a relatively large drive voltage due to the liquid crystal spherical droplets. In particular, the voltage necessary to drive the display device is proportional to the surface-to-volume ratio of the liquid crystal droplets. Such spherical droplets have a surface-to-volume ratio of 3/R where R is the radius of the droplet.

U.S. patent application attorney docket No. JAO 34133, entitled "HOLOGRAPHICALLY FORMED REFLECTIVE DISPLAY, LIQUID CRYSTAL DISPLAY AND PROJECTION SYSTEMS AND METHODS OF FORMING THE SAME", the subject matter of which is incorporated herein, discloses holographically formed reflective displays and projection systems. U.S. Patent application attorney docket No. JAO 34134, entitled "BROADBAND REFLECTIVE DISPLAY AND METHODS OF FORMING THE SAME", the subject matter of which is incorporated herein, discloses broadening the reflective wavelengths by including a plurality of groups of reflective layers each being reflective of different wavelengths of light.

Additionally, there has recently been a great amount of interest in paper-white reflective displays. However, conventional technologies for producing such paper-white displays have produced displays with a low photopic white reflectance of, for example, 10–15%. If aided by passive light shaping elements (brightness enhancement films), the reflectance can be increased to 20–40% at the expense of contrast and viewing angle.

Accordingly, there is a need to provide a paper-white reflective display that has an improved photopic white reflectance, can operate at reduced drive voltages, has a high contrast and has a haze free appearance when viewed from different viewing angles.

SUMMARY OF THE INVENTION

To solve these and other problems, this invention provides a paper-white reflective display that has improved photopic white reflectance, a high contrast, a lack of haze or opaqueness when viewed from various viewing angles and a reduced drive voltage compared to conventional devices. The paper-white reflective display includes first and second substrates, a plurality of groups of liquid crystal and polymer layers located between the first and second substrates, each of the plurality of groups of liquid crystal and polymer layers being reflective of different wavelengths of light and a voltage source connected between the first and second substrates that selectively applies a voltage to all of the liquid crystal and polymer layers.

A more complete understanding of the invention can be obtained by considering the following detailed description,

BRIEF DESCRIPTION OF THE DRAWINGS

FIGS. 2a–2c illustrate the homogenous and homeotropic surface boundary conditions of the reflective display in the off-state;

FIGS. 3a–3c illustrate the homogenous and homeotropic surface boundary conditions of the reflective display in the on-state;

DETAILED DESCRIPTION OF PREFERRED EMBODIMENTS

Figure 1A:
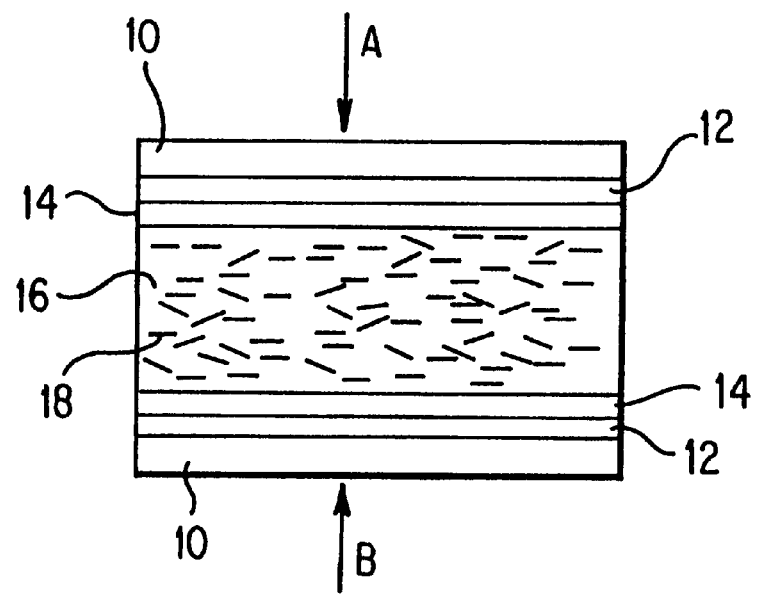
FIG. 1a is a schematic view illustrating a reflective display prior to application of interfering lasers during assembly of the display.

FIG. 1a illustrates a reflective display. Between substrates 10 are formed indium tin oxide layers 12 and alignment layers 14. Alignment layers 14 may be a rubbed polymer layer, where homogeneous surface boundary conditions are desired, or a silane surfactant layer, for example, where homeotropic (perpendicular) surface boundary conditions are desired, as will be further explained below. Displaced between the alignment layers 14 is a anisotropic polymer 18 dissolved in a liquid crystal solvent. The anisotropic polymer 18 may include a photo-active monomer and suitable photo-initiator. The liquid crystal polymer mixture 16 is homogenized via mechanical agitation and heat.

Figure 1B:
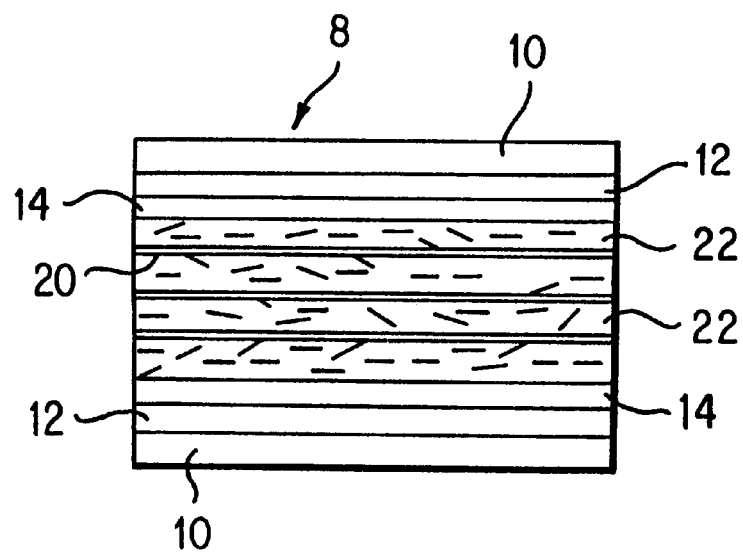
FIG. 1b is a schematic view illustrating the reflective display.

The device is then irradiated with interfering laser beams A and B, for example, that set up interference fringes within the device. The resultant structure is illustrated in FIG. 1b. Regions within the liquid crystal/polymer mixture 16 that experience the high intensity of the interference pattern of the lasers become polymer rich and form polymer sheets 20 and those regions where the intensity is low become void of polymer and form liquid crystal regions 22. As can be seen in Figure 1b, the polymer sheets 20 and liquid crystal regions 22 form into a multilayer structure.

The holographically formed reflective display 8 is illustrated in FIG. 2a in an off-state. The off-state occurs when no electric field is applied between the indium tin oxide layers 12. In the off-state, the display is transparent and all light is transmitted through the display because the molecules of the liquid crystal regions 22 are effectively index matched and aligned with the molecules forming the polymer sheets 20.

The index matching in the off-state for homogeneous and homeotropic surface boundary conditions is illustrated in FIGS. 2b and 2c, which are enlarged views of the liquid crystal layer 22 and polymer sheets 20 within circles 15 and 17 of FIGS. 2a and 3a, respectively. In particular, FIG. 2b illustrates the homogeneous surface boundary conditions that are formed when the alignment layer 14 is a rubbed polymer layer. Such a rubbed polymer layer is well known to those of ordinary skill in the art and is formed by conventional rubbing techniques. The rubbed polymer layer causes the molecules within the polymer sheets 20 and within the liquid crystal regions 22 to form along the planar alignment direction of the nematic liquid crystal medium in a direction generally parallel to a surface of the substrate 10. As may be seen with reference to FIG. 2b, because the polymer molecules forming the polymer sheets 20 are anisotropic polymer molecules, the molecules are elongated and align in a single direction. Likewise, the molecules forming liquid crystal regions 22 are anisotropic and hence align in the same direction as the molecules forming the polymer sheets. This index matched alignment vastly reduces haze in the holographically formed reflective display 8 when it is viewed from various viewing angles. Conventional holographically formed reflective displays, in contrast, use isotropic polymers which are randomly aligned and thus create haze and opaqueness when viewed from various viewing angles.

Homeotropic surface boundary conditions for the reflective display 8 are illustrated in FIG. 2c, which is an enlarged view of the circle 15 shown in FIG. 2a. The homeotropic surface boundary conditions are created when the alignment layer 14 includes perpendicular alignment. One example is a silane surfactant layer. This causes the anisotropic polymer within the polymer sheets 20 to align substantially perpendicular to a surface of the substrates 10 as illustrated in FIG. 2C. Likewise, because the molecules within the liquid crystal region 22 are anisotropic, they align in the same direction as the anisotropic polymer molecules forming the polymer sheets 20. Again, use of the anisotropic polymer greatly reduces haze and opaqueness in the holographically formed reflective display 8 when viewed from various viewing angles.

FIG. 3a illustrates the holographically formed reflective display 8 in an on-state. In the on-state, a voltage from a voltage source 24 is applied between the indium tin oxide layers 12. This creates an electric field in the direction illustrated by arrow E and causes the display to be reflective of light of a desired wavelength. The desired wavelength of the reflected light may be selected during formation of the device by appropriately controlling the wavelengths of the interference fringes created by the laser or other holograhic means used during device formation.

FIG. 3b is an enlarged view of the area shown within circle 17 in FIG. 3a for homogenous surface boundary conditions. Application of the electric field E between the indium tin oxide layers causes molecules with positive dielective anisotropy within the liquid crystal regions 22 to align parallel to the E direction, as illustrated in FIG. 3b. This causes light of a desired wavelength to be reflected while all other light is transmitted.

Homeotropic surface boundary conditions for the holographically formed reflective display 8 in the on-state are illustrated in FIG. 3c. For the case of homeotropic alignment, the liquid crystal material used is one with negative dielectric anisotropy. Here, application of the electric field E causes the molecules with negative dielectric anisotropy within the liquid crystal region 22 to align perpendicular to the E field direction causing light of the desired wavelength to be reflected.

Figure 4:
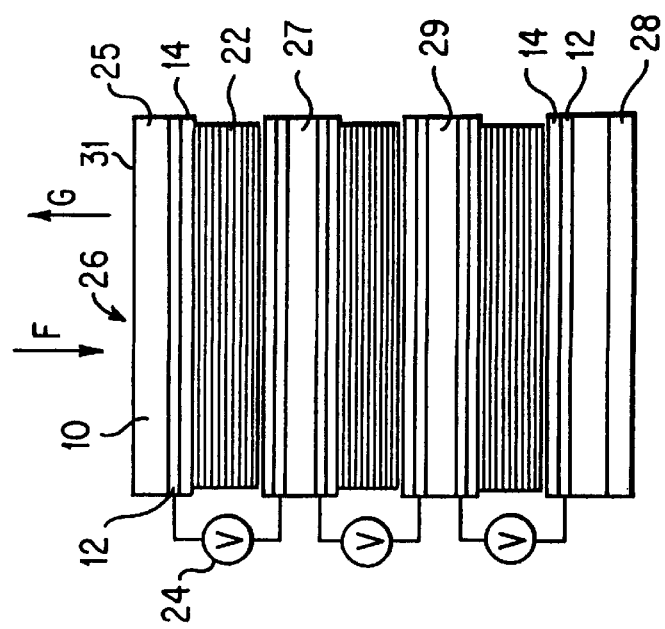
FIG. 4 illustrates a full-color reflective liquid crystal display.

A full-color liquid crystal display is illustrated in FIG. 4. For the case of homogeneous surface alignment, the liquid crystal material used is one with positive dielectic anisotropy. The full-color liquid crystal display 26 includes three holographically formed reflective displays 25, 27 and 29 (which are similar to the holographically formed reflective display 8) each being reflective of a different wavelength of light. The full-color liquid crystal display 26 includes black absorber 28 which is used to absorb non-reflective wavelengths and enhance display contrasts. As illustrated in FIG. 4, ambient light is exposed to the upper surface 31 of the full-color liquid crystal display 26 in the direction of arrow F. To form an image, the voltage sources 24 are each independently controlled to selectively reflect light from each of the holographically formed reflective displays 8, each reflecting light of a different wavelength. For example, the upper reflective display 25 in FIG. 4 may reflect light of 465 nm, the middle holographically formed reflective display 27 may reflect light of 545 nm and the lower holographically formed reflective display 29 may reflect light of 620 nm, to reflect light of blue, green and red wavelengths, respectively. By selectively activating the three holographic reflective display layers, a full-color image may be formed from incident broad-band illumination.

Figure 5:
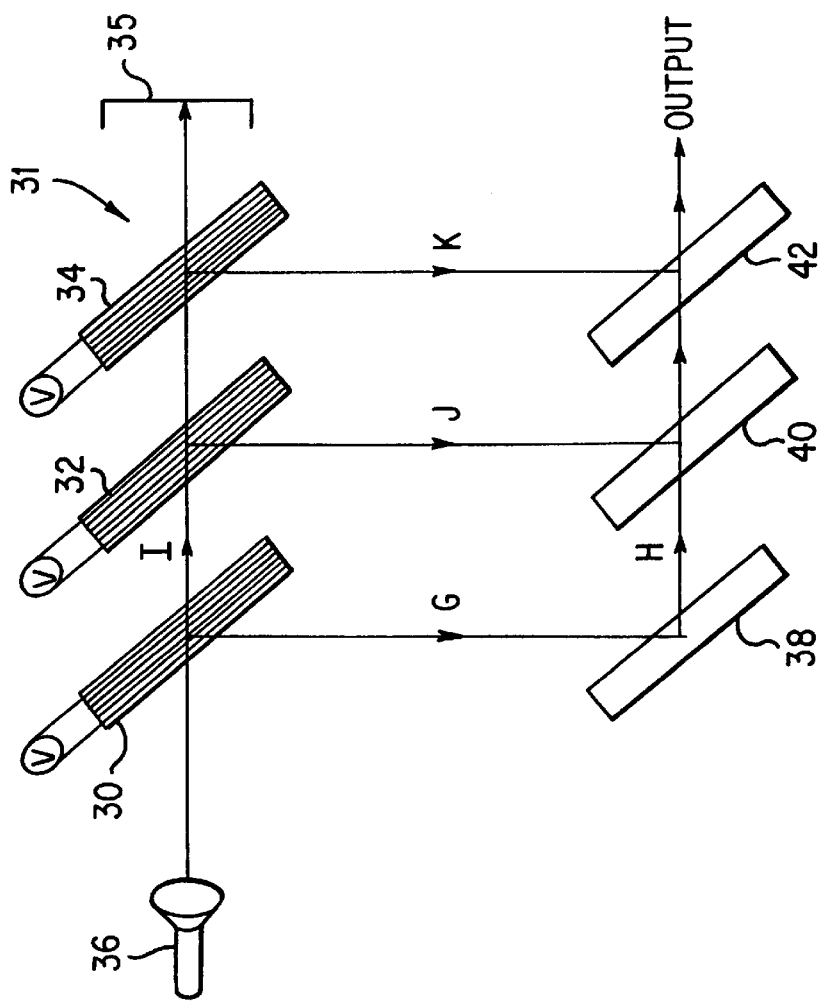
FIG. 5 illustrates a projection system which includes three reflective displays.

FIG. 5 illustrates a full-color projection system 31 which includes a first holographically formed reflective display 30, which may selectively reflect red light having an approximate wavelength of 620 nm, a second holographically formed reflective display 32, which may reflect green light of approximately 545 nm and a third holographically formed reflective display 34, which may reflect blue light of approximately 465 nm.

Light is input from a light source 36 and upon contacting the first holographically formed reflective display 30, red light having a wavelength of approximately 620 nm is reflected in the direction of arrow G onto mirror 38 and reflected towards an output in a direction of arrow H. Light which is not of the red wavelength of approximately 620 nm is transmitted by the first holographically formed reflective display 30 in the direction of arrow I to the second holographically formed reflective display 32. The second holographically formed reflective display 32 reflects light with a green wavelength of approximately 545 nm in the direction of arrow J onto a surface of first dichroic mirror 40. First dichroic wavelength mirror 40 transmits the red light reflected by mirror 38 and reflects the green light in a direction of arrow H. Light from the light source 36 which is not reflected by the second holographically formed reflective display 32 is transmitted to the third holographically formed reflective display 34, which reflects light of a blue wavelength of approximately 465 nm in the direction of arrow K onto a surface of second dichroic mirror 42.

Light which is not reflected by third holographically formed reflective display 34 is transmitted to light stop 35. Second dichroic mirror 42 reflects the blue wavelength light in the direction of arrow H and transmits the red and green light from mirror 38 and first dichroic mirror 40 to the output. In this way, an image may be formed and projected by the full-color projection system 31.

The above-noted reflective wavelengths for the first, second and third holographically formed reflective displays 30, 32 and 34 of the projection system 31 may be varied to the desired value by adjusting the wavelength of light that is reflected by each display to a desired value, as discussed above regarding the FIG. 2a–3c embodiment.

The above-described holographically formed reflective displays may achieve bistable switching by using a chiral nematic or ferroelectric liquid crystal material instead of a typical nematic liquid crystal material which would normally be used. Bistability is more fully discussed in a related application entitled "Bistable Reflective Display Using Chiral Liquid Crystal and Reconfigurable Inorganic Agglomerates" (Attorney Docket No. JAO 34136), the subject matter of which is incorporated herein by reference in its entirety.

Figure 6:
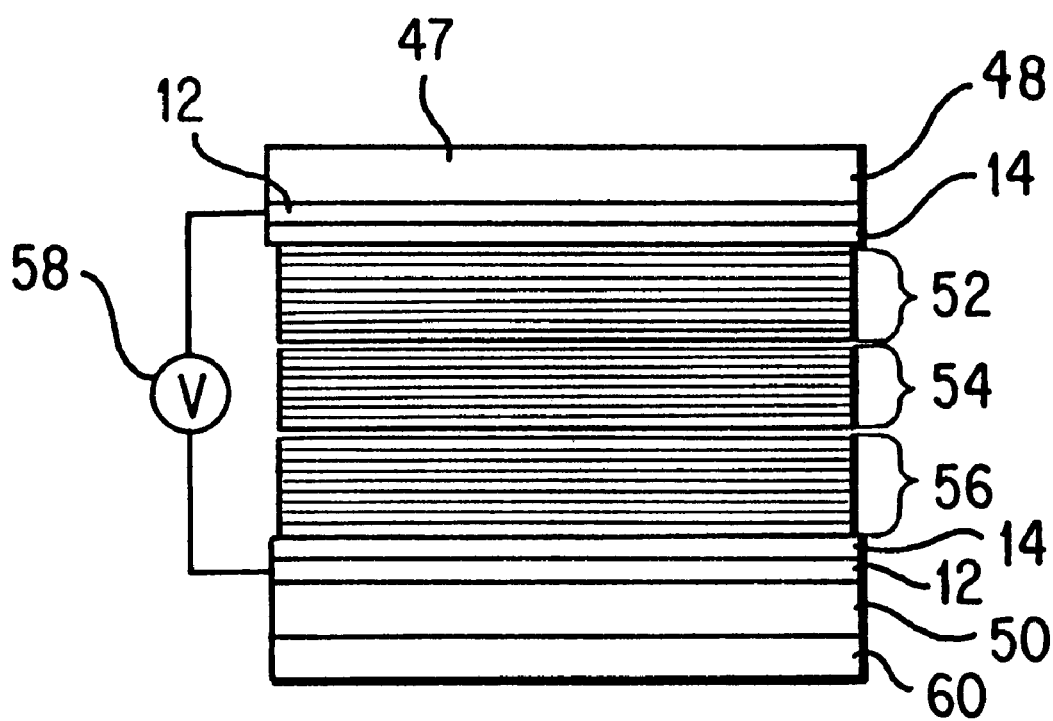
FIG. 6 illustrates a paper-white reflective display.

FIG. 6 illustrates a paper-white reflective display 47. The paper-white reflective display 47 is similar to the reflective display 26 of FIG. 4 except that the paper-white reflective display 47 includes only two substrates 48 and 50 between which three groups of liquid crystal and polymer layers 52, 54 and 56 are formed.

Each of the groups of liquid crystal and polymer layers 52, 54 and 56 may include one liquid crystal layer and one polymer layer or a plurality of liquid crystal layers and a plurality of polymer layers, in the same manner as illustrated in Fig. 1b, for example. Each of the groups of liquid crystal and polymer layers 52, 54 and 56 are formed as discussed above to be reflective of different wavelengths of light. For example, the group of liquid crystal and polymer layers 52 may be reflective of red light having a center wavelength of approximately 630 nm, the group of liquid crystal and polymer layers 54 may be reflective of green light having a center wavelength of approximately 540 nm, and the group of liquid crystal and polymer layers 56 may be reflective of blue light having a center wavelength of approximately 480 nm. Because the voltage source 58 applies or does not apply a voltage to substrates 48 and 50 and hence to each of the groups of liquid crystal and polymer layers 52, 54 and 56, the paper-white reflective display 47 will cause all of the groups of liquid crystal and polymer layers 52, 54 and 56 to be reflective or transparent at any given time. When the groups of liquid crystal and polymer layers 52, 54 and 56 are all in the reflective state, the paper-white reflective display 47 takes on a paper-white appearance due to the combination of red, green and blue light all being simultaneously reflected.

The paper-white reflective display 47 also includes a black absorber 60 formed adjacent to substrate 50. The black absorber 60 acts as a light stop which absorbs non-reflected wavelengths, thereby enhancing display contrast and giving the display a black appearance when the liquid crystal and polymer layers 52, 54 and 56 are in a transparent state.

Figure 7A:
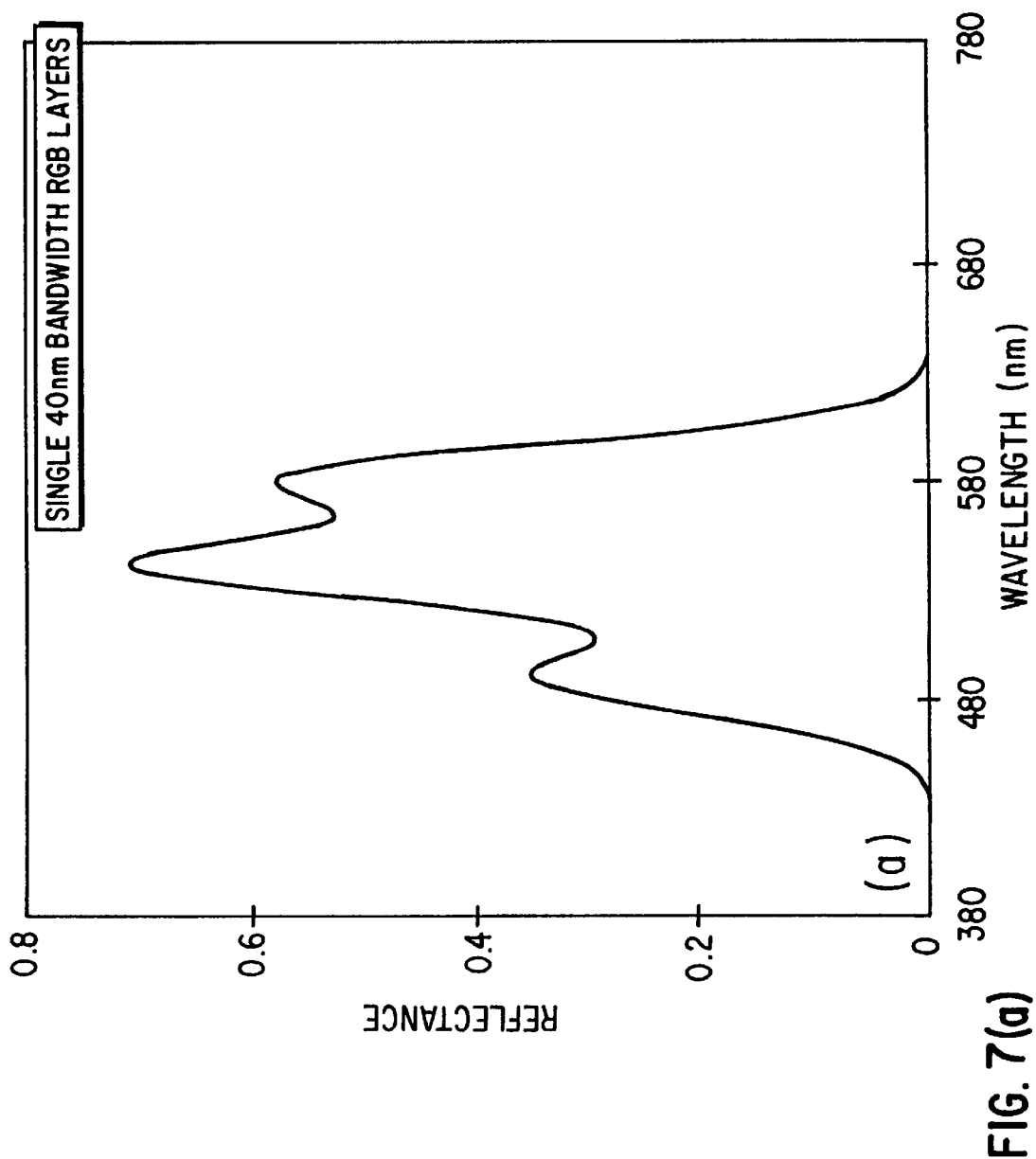
FIGS. 7a and 7b are graphs illustrating reflectance versus wavelength and a diagram showing the chromaticity of the white-point, respectively, for the paper-white reflective display of FIG. 6.
Figure 7B:
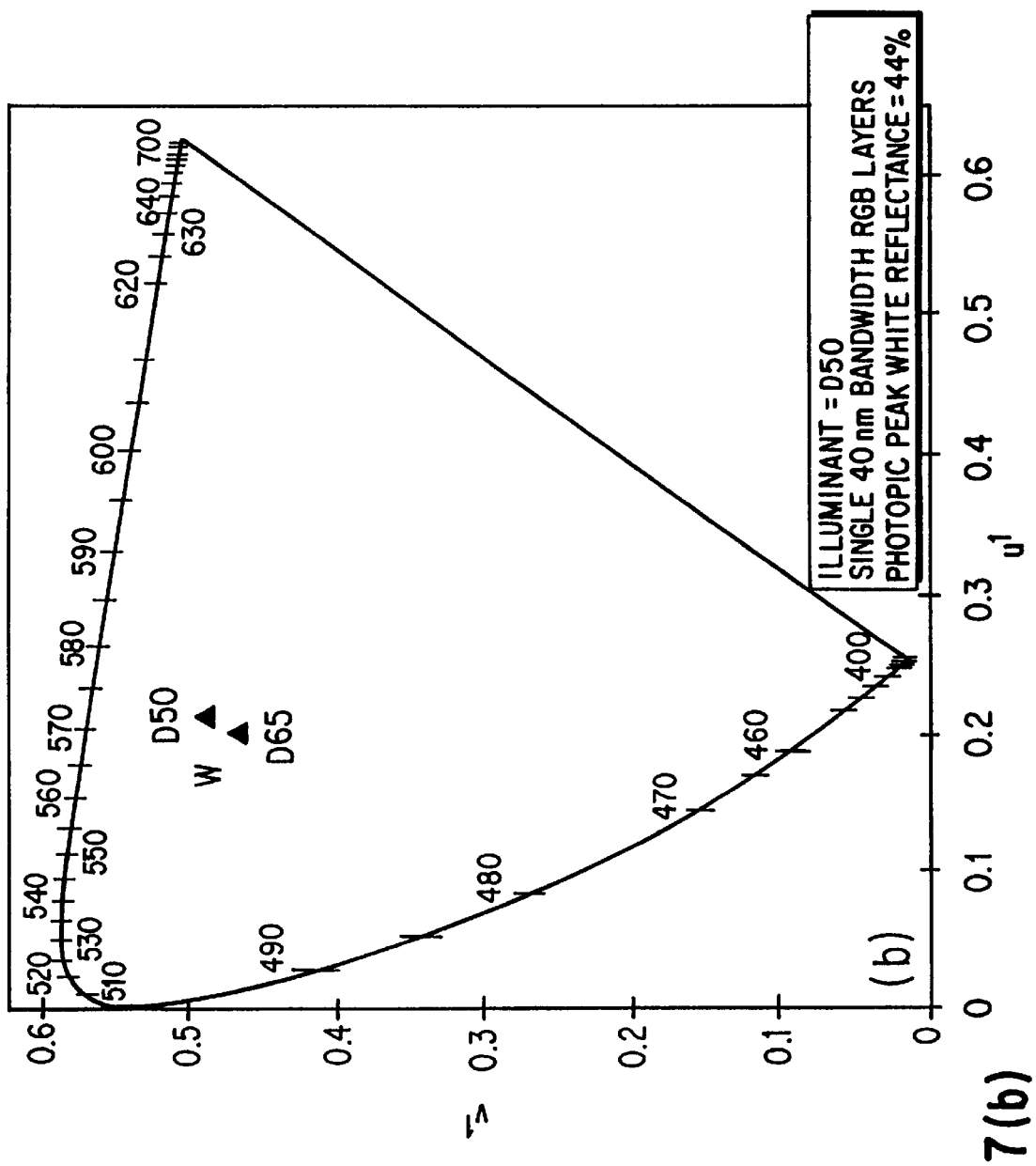

FIG. 7a is a composite reflectance versus wavelength graph illustrating the reflectance of the paper-white reflective display 47 with the groups of liquid crystal and polymer layers 52, 54 and 56 being reflective of the above-described center wavelengths of light, each group being reflective of light having an approximately 40 nm bandwidth. FIG. 7b is a chromaticity chart of the paper-white reflective display 47 and illustrates the chromaticity value for the display whitepoint for the paper-white reflective display 47 and its desired proximity to D50 and D65 standard illuminants. The photopic reflectance of the white state is approximately 44%, as noted in FIG. 7b.

Figure 8:
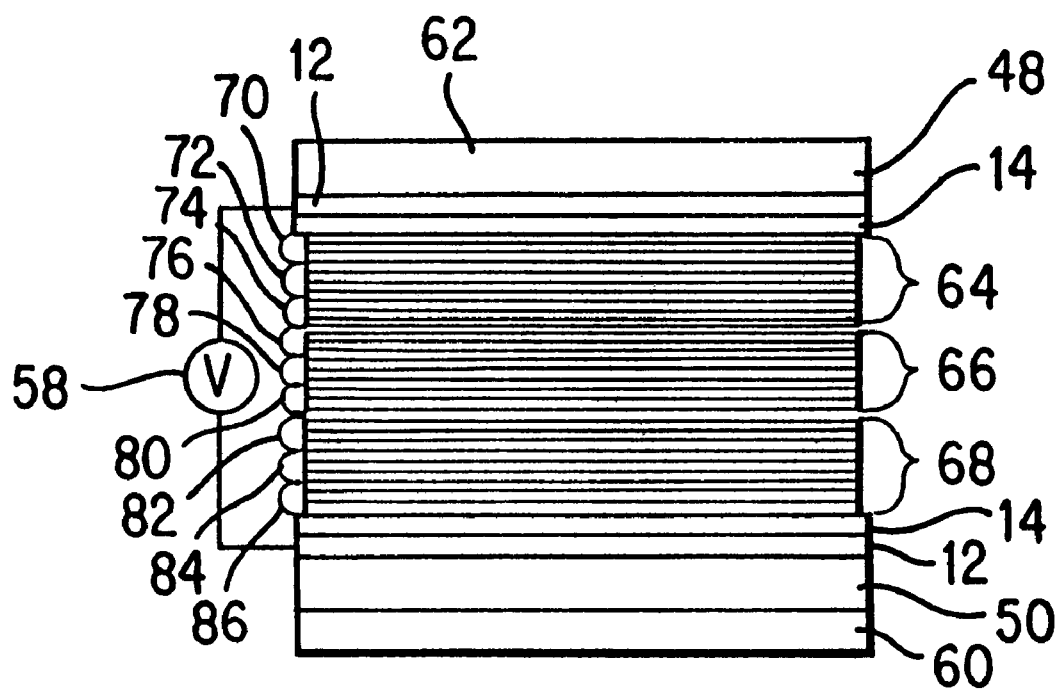
FIG. 8 illustrates a paper-white reflective display having a plurality of sub-layers.

FIG. 8 illustrates paper-white reflective display 62. For each group of liquid crystal and polymer layers 64, 66 and 68, the paper-white reflective display 62 includes a plurality of liquid crystal and polymer sub-layers each being reflective of a different wavelength of light. The illustrated embodiment includes nine liquid crystal and polymer sublayers 70–86, three for each group. However, different numbers of groups or sub-layers may be used. The groups and sub-layers are tuned to particular wavelengths as described above regarding the FIG. 2a–3c embodiment.

The group of liquid crystal and polymer layers 64 includes three liquid crystal and polymer sub-layers 70, 72 and 74 each being reflective of red wavelengths of light, but having their central wavelengths shifted from one another to broaden the spectral reflectance. The three liquid crystal and polymer sub-layers 70, 72 and 74 may have central wavelengths of 600 nm, 630 nm and 660 nm, respectively.

The group of liquid crystal and polymer layers 66 includes three liquid crystal and polymer sub-layers 76, 78 and 80 each being reflective of green wavelengths of light, but having their central wavelengths shifted from one another to broaden the spectral reflectance. The three liquid crystal and polymer sub-layers 76, 78 and 80 may have central wavelengths of 510 nm, 540 nm and 570 nm, respectively.

The group of liquid crystal and polymer layers 68 includes three liquid crystal and polymer sub-layers 82, 84 and 86 each being reflective of blue wavelengths of light, but having their central wavelengths shifted from one another to broaden the spectral reflectance. The three liquid crystal and polymer sub-layers 82, 84 and 86 may have central wavelengths of 460 nm, 480 nm and 500 nm, respectively. Each of the liquid crystal and polymer sub-layers may have a 40 nm bandwidth.

Figure 9A:
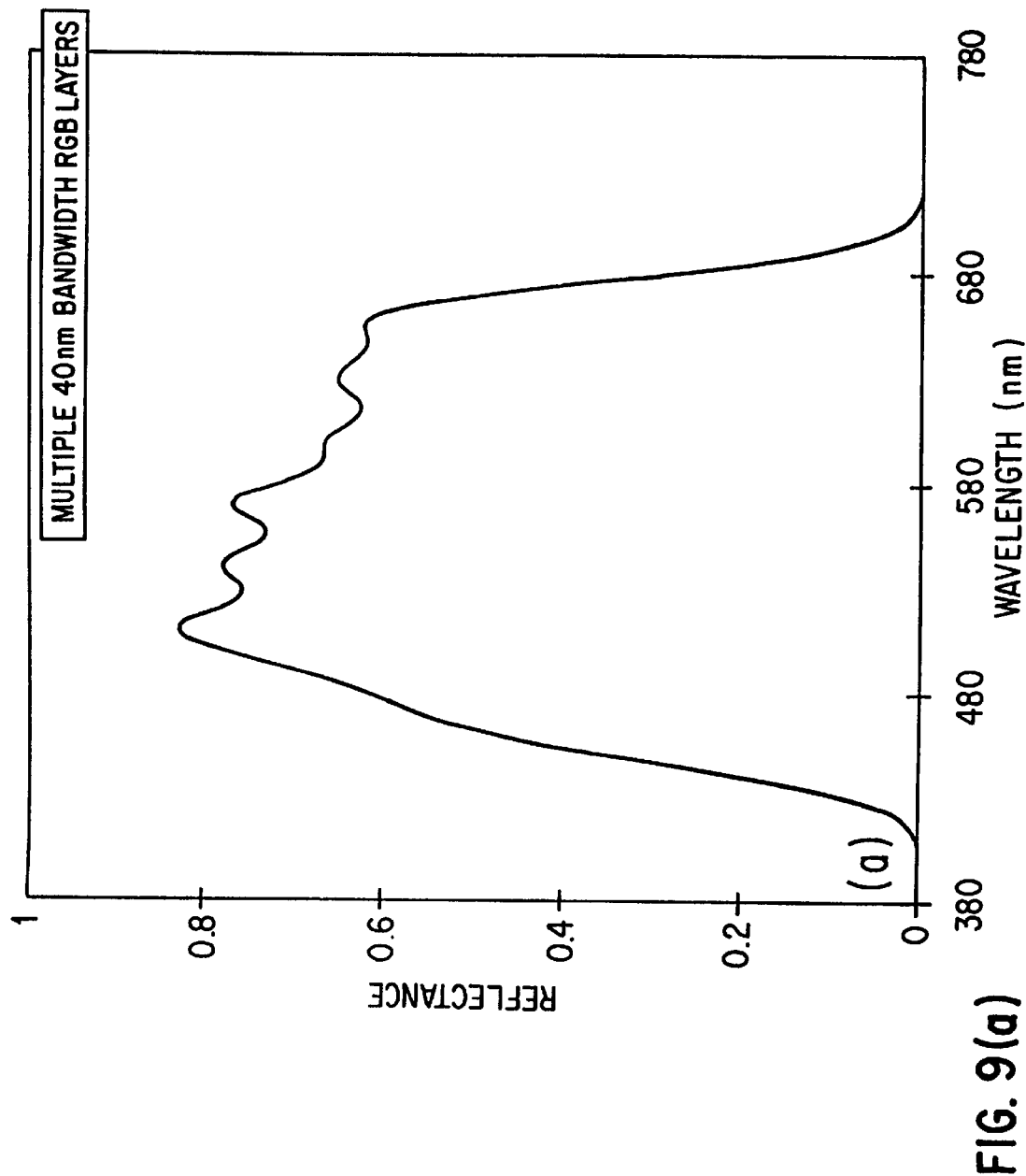
FIGS. 9a and 9b are graphs illustrating reflectance versus wavelength and a diagram showing the chromaticity of the white-point, respectively, for the paper-white reflective display of FIG. 8.
Figure 9B:
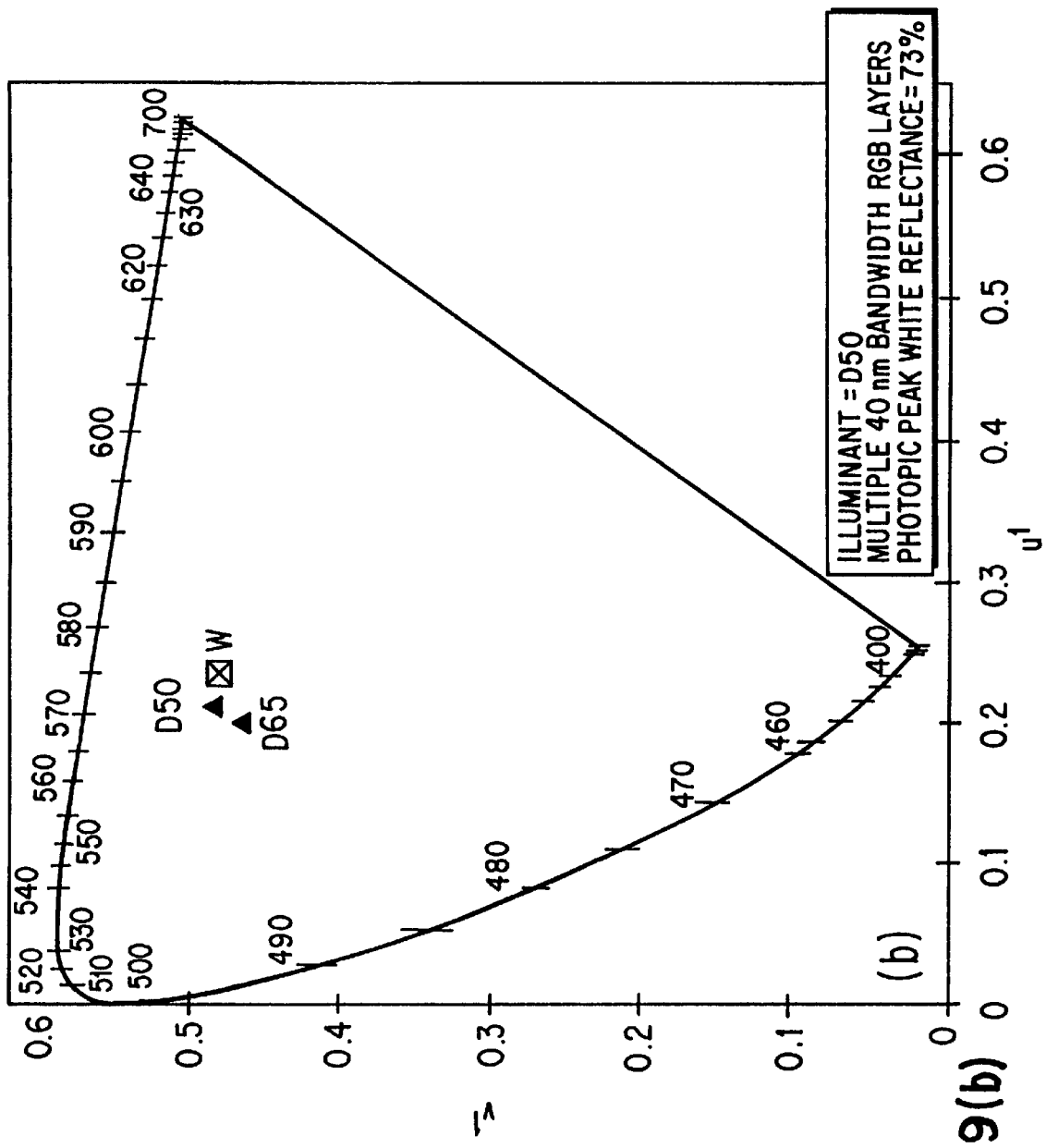

FIG. 9a is a composite reflectance versus wavelength graph illustrating the reflectance of the paper-white reflective display 62. The relative reflectance values of the green, red and blue peaks have been adjusted 9a to achieve the desired white-point chromaticity. Because this embodiment greatly increases the bandwidth of the reflectance peaks compared to the reflective display of FIG. 6, the photopic white reflectance is increased to 73%. FIG. 9b is a chromaticity chart of the paper-white reflective display 62 and as illustrated, produces a desired white-point chromaticity in close proximity to the D50 and D65 standard illuminants.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A paper-white reflective display, comprising:
   first and second substrates;
   a plurality of groups of liquid crystal and anisotropic polymer layers located between the first and second substrates, each of the plurality of groups of liquid crystal and polymer layers being reflective of different wavelengths of light, wherein the anisotropic polymer layers are holographically formed of at least a photo-active monomer and a photo-initiator; and
   a voltage source connected between the first and second substrates that selectively applies a voltage to all of the liquid crystal and polymer layers.

2. The paper-white reflective display of claim 1, further comprising a black absorber layer disposed adjacent to one of the substrates.

3. The paper-white reflective display of claim 1, wherein the plurality of groups liquid crystal and anisotropic polymer layers comprise three groups of liquid crystal and anisotropic polymer layers, a first group of the three groups being reflective of red wavelengths of light, a second group of the three groups being reflective of green wavelengths of light and a third group of the three groups being reflective of blue wavelengths of light.

4. The paper-white reflective display of claim 3, wherein the red, green and blue wavelengths of light comprise wavelengths centered at approximately 630 nm, 540 nm and 480 nm, respectively.

5. The paper-white reflective display of claim 1, wherein the reflective display operates in a reverse mode in which when no voltage is applied by the voltage source, the reflective display has a black appearance, and when a voltage is applied by the voltage source, the reflective display enters a white state having a paper-white appearance.

6. The paper-white reflective display of claim 5, wherein the reflective display has a photopic reflectance of the white state of 44%.

7. The paper-white reflective display of claim 1, wherein each of the groups of liquid crystal and anisotropic polymer layers comprise a plurality of liquid crystal and polymer sub-layers, each of the sub-layers being reflective of different wavelengths of light.

8. The paper-white reflective display of claim 7, wherein the groups of liquid crystal and anisotropic polymer layers comprise first, second and third groups of liquid crystal and anisotropic polymer layers, and the first group of liquid crystal and anisotropic polymer layers comprises first, second and third liquid crystal and polymer sub-layers, the second group of liquid crystal and anisotropic polymer layers comprises fourth, fifth and sixth liquid crystal and polymer sub-layers, and the third group of liquid crystal and anisotropic polymer layers comprises seventh, eighth and ninth liquid crystal and polymer sublayers.

9. The paper-white reflective display of claim 8, wherein the first, second and third liquid crystal and polymer sub-layers are reflective of light having center wavelengths of approximately 600 nm, 630 nm and 660 nm, respectively, the fourth, fifth and sixth liquid crystal and polymer sub-layers are reflective of light having center wavelengths of approximately 510 nm, 540 nm and 570 nm, respectively, and the seventh, eighth and ninth liquid crystal and polymer sub-layers are reflective of light having center wavelengths of approximately 460 nm, 480 nm and 500 nm, respectively.

10. The paper-white reflective display of claim 9, wherein the reflective display has a photopic reflectance of the white state of approximately 73%.

11. The paper-white reflective display of claim 1, wherein the liquid crystal layers are formed from one of a nematic, a chiral nematic or a ferroelectric liquid crystal material.

12. The paper-white reflective display of claim 1, wherein the liquid crystal layers and anisotropic polymer layers are index matched so as to reduce haze in the display when viewed from various viewing angles.

13. The paper-white reflective display of claim 1, further comprising a rubbed polymer layer formed between the substrates and the liquid crystal layers so as to cause homogeneous surface boundary conditions between polymer molecules within the anisotropic polymer layers and liquid crystal molecules within the liquid crystal layers.

14. The paper-white reflective display of claim 1, further comprising a material inducing homeotropic surface anchoring formed between the substrates and the liquid crystal layers so as to cause homeotropic surface boundary conditions between polymer molecules within the anisotropic polymer layers and liquid crystal molecules within the liquid crystal layers.

15. A method of forming a paper white reflective display, comprising:
   forming first and second substrates;
   forming a plurality of groups of liquid crystal and anisotropic polymer layers between the first and second substrates, each of the plurality of groups of liquid crystal and anisotropic polymer layers being reflective of different wavelengths of light, wherein the anisotropic polymer layers are holographically formed of at least a photoactive monomer and a photo-initiator; and connecting a voltage source between the first and second substrates that selectively applies a voltage to all of the liquid crystal and polymer layers.

16. The method of forming a paper-white reflective display of claim 15, further comprising forming a black absorber layer adjacent to one of the substrates.

17. The method of forming a paper-white reflective display of claim 15, wherein forming the plurality of groups liquid crystal and anisotropic polymer layers comprises forming three groups of liquid crystal and anisotropic polymer layers, a first group of the three groups being reflective of red wavelengths of light, a second group of the three groups being reflective of green wavelengths of light and a third group of the three groups being reflective of blue wavelengths of light.

18. The method of forming a paper-white reflective display of claim 17, wherein the red, green and blue wavelengths of light comprise wavelengths centered at approximately 630 nm, 540 nm and 480 nm, respectively.

19. The method of forming a paper-white reflective display of claim 15, wherein forming each of the groups of liquid crystal and anisotropic polymer layers comprises forming a plurality of liquid crystal and polymer sublayers, each of the sub-layers being reflective of different wavelengths of light.

20. The method of forming a paper-white reflective display of claim 19, wherein forming the groups of liquid crystal and anisotropic polymer layers comprises forming first, second and third groups of liquid crystal and anisotropic polymer layers, and forming the first group of liquid crystal and anisotropic polymer layers comprises forming first, second and third liquid crystal and polymer sub-layers, forming the second group of liquid crystal and anisotropic polymer layers comprises forming fourth, fifth and sixth liquid crystal and polymer sub-layers, and forming the third group of liquid crystal and anisotropic polymer layers comprises forming seventh, eighth and ninth liquid crystal and polymer sublayers.

21. The method of forming a paper-white reflective display of claim 20, wherein the first, second and third liquid crystal and polymer sub-layers are reflective of light having center wavelengths of approximately 600 nm, 630 nm and 660 nm, respectively, the fourth, fifth and sixth liquid crystal and polymer sub-layers are reflective of light having center wavelengths of approximately 510 nm, 540 nm and 570 nm, respectively, and the seventh, eighth and ninth liquid crystal and polymer sub-layers are reflective of light having center wavelengths of approximately 460 nm, 480 nm and 500 nm, respectively.

22. The method of forming a paper-white reflective display of claim 21, wherein the reflective display has a photopic reflectance of the white state of approximately 73%.

23. The method of forming a paper-white reflective display of claim 15, wherein forming the liquid crystal layers comprises forming the liquid crystal layers from one of a nematic, a chiral nematic or a ferroelectric liquid crystal material.

24. The method of forming a paper-white reflective display of claim 15, further comprising forming the liquid crystal layers and anisotropic polymer layers from index matched materials so as to reduce haze in the display when viewed from various viewing angles.

25. The method of forming a paper-white reflective display of claim 15, further comprising forming a rubbed polymer layer between the substrates and the liquid crystal layers so as to cause homogeneous surface boundary conditions between polymer molecules within the anisotropic polymer layers and liquid crystal molecules within the liquid crystal layers.

26. The paper-white reflective display of claim 15, further comprising forming a material inducing homeotropic surface anchoring between the substrates and the liquid crystal layers so as to cause homeotropic surface boundary conditions between polymer molecules within the anisotropic polymer layers and liquid crystal molecules within the liquid crystal layers.

* * * * *